United States Patent
Shridhar et al.

(10) Patent No.: US 10,684,933 B2
(45) Date of Patent: Jun. 16, 2020

(54) SMART SELF-HEALING SERVICE FOR DATA ANALYTICS SYSTEMS

(71) Applicant: SAP SE, Walldorf (DE)

(72) Inventors: Archana Shridhar, Bangalore (IN); Sahil Bawa, Bangalore (IN)

(73) Assignee: SAP SE, Walldorf (DE)

( * ) Notice: Subject to any disclaimer, the term of this patent is extended or adjusted under 35 U.S.C. 154(b) by 66 days.

(21) Appl. No.: 15/361,731

(22) Filed: Nov. 28, 2016

(65) Prior Publication Data

US 2018/0150342 A1   May 31, 2018

(51) Int. Cl.
*G06F 11/00* (2006.01)
*G06F 11/34* (2006.01)
*G06F 11/07* (2006.01)

(52) U.S. Cl.
CPC ...... *G06F 11/3409* (2013.01); *G06F 11/3495* (2013.01); *G06F 11/0793* (2013.01); *G06F 11/3419* (2013.01); *G06F 2201/81* (2013.01)

(58) Field of Classification Search
CPC .. G06F 11/3409; G06F 21/552; G06F 21/566; G06F 11/3433; G06F 11/3452; G06F 11/3442; G06F 2009/4557; G06F 13/18; G06F 17/18; G06F 2201/81; G06F 2201/87; G06F 2209/485; G06F 2209/486; G06F 2209/5022; G06N 99/005; H04L 43/16; H04L 41/5025; H04L 41/0896; H04L 41/5003; H04L 41/5009

See application file for complete search history.

(56) References Cited

U.S. PATENT DOCUMENTS

| | | | | |
|---|---|---|---|---|
| 5,283,897 A * | 2/1994 | Georgiadis | ............ | G06F 9/5083 711/151 |
| 6,175,869 B1 * | 1/2001 | Ahuja | ................ | H04L 67/1008 709/203 |
| 6,397,359 B1 * | 5/2002 | Chandra | ............ | H04L 41/5009 709/224 |
| 7,275,048 B2 * | 9/2007 | Bigus | .................. | G06F 11/2257 706/46 |
| 7,346,401 B2 * | 3/2008 | Diao | ...................... | G06F 9/5083 700/28 |
| 8,326,910 B2 * | 12/2012 | Bobak | ................ | H04L 41/5012 709/200 |
| 8,539,075 B2 * | 9/2013 | Bali | .................... | H04L 41/5019 709/223 |
| 8,682,705 B2 * | 3/2014 | Bobak | .................... | G06Q 10/06 705/7.22 |
| 8,898,200 B2 | 11/2014 | Shridhar et al. | | |

(Continued)

*Primary Examiner* — Loan L. T. Truong (74) *Attorney, Agent, or Firm* — Fish & Richardson P.C.

(57) ABSTRACT

Methods, systems, and computer-readable storage media for automatically detecting potential performance degradation in a data analytics system including multiple servers, actions include determining a threshold performance score for each server of the multiple servers during an initial period, the threshold performance scores being determined at least partially based on a report generated by a respective server, and, after the initial period, and for each server: intermittently calculating a performance score, comparing the performance score to the threshold performance score to determine whether a violation indicating performance degradation occurs, and transmitting a notification to report consecutive violations.

18 Claims, 4 Drawing Sheets

(56) References Cited

U.S. PATENT DOCUMENTS

| | | | |
|---|---|---|---|
| 9,043,421 B1* | 5/2015 | Coon | H04L 43/0823 709/200 |
| 9,152,880 B1* | 10/2015 | Moyer | A61B 5/16 |
| 9,189,272 B2* | 11/2015 | Kanemasa | G06F 9/4881 |
| 9,282,052 B2* | 3/2016 | Kakadia | H04L 47/522 |
| 9,665,288 B1* | 5/2017 | Aharoni | G06F 3/061 |
| 9,703,664 B1* | 7/2017 | Alshawabkeh | G06F 11/3414 |
| 9,712,404 B2* | 7/2017 | Ozaki | H04L 43/04 |
| 9,715,263 B2* | 7/2017 | Nagase | G06F 1/266 |
| 9,753,987 B1* | 9/2017 | Dolan | G06F 16/24578 |
| 9,785,454 B2* | 10/2017 | van de Kamp | G06F 9/455 |
| 9,824,243 B2* | 11/2017 | Chen | G06N 99/005 |
| 9,940,033 B1* | 4/2018 | Alshawabkeh | G06F 11/3433 |
| 10,268,526 B1* | 4/2019 | Martin | G06F 9/542 |
| 2003/0023743 A1* | 1/2003 | Raphel | H04L 47/10 709/232 |
| 2003/0046031 A1* | 3/2003 | Conrad | H04L 41/0206 702/188 |
| 2004/0236757 A1* | 11/2004 | Caccavale | G06F 11/3409 |
| 2005/0114429 A1* | 5/2005 | Caccavale | G06F 9/505 709/200 |
| 2005/0268063 A1* | 12/2005 | Diao | G06F 9/5083 711/170 |
| 2008/0222068 A1* | 9/2008 | Bahl | G06N 5/043 706/46 |
| 2010/0100604 A1* | 4/2010 | Fujiwara | G06F 12/0866 709/213 |
| 2014/0108702 A1* | 4/2014 | Mizushima | G06F 12/0246 711/103 |
| 2015/0269002 A1* | 9/2015 | Yoshimoto | G06F 9/5038 718/1 |
| 2015/0334173 A1* | 11/2015 | Coulmeau | H04L 67/10 709/203 |
| 2015/0365309 A1* | 12/2015 | Kaminski | H04L 47/70 709/224 |
| 2016/0004551 A1* | 1/2016 | Terayama | G06F 9/5011 718/1 |
| 2016/0182687 A1* | 6/2016 | Coulmeau | H04L 41/14 709/203 |
| 2016/0328273 A1* | 11/2016 | Molka | G06F 9/505 |
| 2017/0005866 A1* | 1/2017 | Farhan | H04L 41/0846 |
| 2017/0024660 A1* | 1/2017 | Chen | G06N 99/005 |
| 2017/0272343 A1* | 9/2017 | Giles | H04L 43/10 |
| 2017/0329660 A1* | 11/2017 | Salunke | G06F 11/079 |
| 2017/0373960 A1* | 12/2017 | Sachdev | H04L 43/10 |
| 2018/0020024 A1* | 1/2018 | Chao | G06F 17/18 |
| 2018/0067881 A1* | 3/2018 | Frandzel | G06F 13/1642 |

* cited by examiner

SMART SELF-HEALING SERVICE FOR DATA ANALYTICS SYSTEMS

BACKGROUND

Data analytics systems can be employed to process relatively large amounts of data to provide information and/or insights into operations. For example, an enterprise can employ a data analytics system to process data and generate reports that provide insight into enterprise operations. In this manner, the enterprise is able to make strategic decisions in managing its operations.

A data analytics system can be provided as a platform including databases, servers, applications, and clients. Servers can be tasked with the heavy-lifting in data processing, analysis, and report generation. As the amount of data increases, and/or demand on the servers increases, overall performance of the data analytics platform may deteriorate. For example, the response time from the data analytics system can decrease. In response to deteriorating performance, additional resources (e.g., servers) can be added to the data analytics system. However, this generally occurs after a performance issue already arises, and can take time to implement.

SUMMARY

Implementations of the present disclosure include computer-implemented methods for automatically addressing performance degradation in a data analytics system comprising multiple servers. In some implementations, actions include determining a threshold performance score for each server of the multiple servers during an initial period, the threshold performance scores being determined at least partially based on a report generated by a respective server, and, after the initial period, and for each server: intermittently calculating a performance score, comparing the performance score to the threshold performance score to determine whether a violation indicating performance degradation occurs, and transmitting a notification to report consecutive violations. Other implementations of this aspect include corresponding systems, apparatus, and computer programs, configured to perform the actions of the methods, encoded on computer storage devices.

These and other implementations can each optionally include one or more of the following features: actions further include automatically adjusting one or more parameters of the server to at least partially alleviate the performance degradation; each performance score is determined based on one or more of an average report size, a request rate, a maximum memory, a performance rating, and a number of CPU cores of the respective server; determining a threshold performance score for each server of the multiple servers during an initial period includes, for each server, calculating multiple performance scores during the initial period, and providing the threshold performance score as an average of the multiple performance scores; a violation indicating performance degradation occurs in response to determining that the performance score exceeds the threshold performance score; the consecutive violations include two or more consecutive performance scores exceeding the threshold performance score; and actions further include re-determining the threshold performance score for a server in response to adjustment of one or more parameters of the server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a smart self-healing service for data analytics systems. More particularly, implementations of the present disclosure are directed to monitoring performances of respective servers, and proactively alert and/or adjust to alleviate performance degradation of a data analytics system. In some implementations, actions include determining a threshold performance score for each server of the multiple servers during an initial period, the threshold performance scores being determined at least partially based on a report generated by a respective server, and, after the initial period, and for each server: intermittently calculating a performance score, comparing the performance score to the threshold performance score to determine whether a violation indicating performance degradation occurs, and transmitting a notification to report consecutive violations.

As introduced above, data analytics systems can be employed to process relatively large amounts of data to provide information and/or insights into operations. In some examples, a data analytics system can be deployed as an enterprise-level platform that includes databases, servers, applications, and clients. In some examples, the data analytics system processes data and generates reports that provide insight into enterprise operations. An example data analytics system includes the SAP Business Intelligence (BI) platform provided by SAP SE of Walldorf, Germany.

The amount of data processed by, the number of reports generated by, and the number of users accessing the data analytics can significantly increase over the lifetime of the data analytics system. In some examples, the data analytics system is initially configured based on an expected workload, and the data analytics is put into operation based on the expected workload. In some examples, the actual workload is greater than, or increases over the expected workload. Consequently, performance of the data analytics system can deteriorate, as the resources (e.g., servers) become insufficient to handle the workload.

In further detail, operations performed by a data analytics system can including extracting information from a potentially large amount of data, analyzing the data, and producing data visualizations in the form of the reports. Such operations can require adequate amounts of resources (e.g., computer processing power), and exercises across all subsystems of a computing device: central processing units (CPUs), memory, disk, and network. Having the right amount of capacity for these subsystems is required to ensure performance of the data analytics system, and that the performance does not deteriorate to an unacceptable level. Further, data analytics systems can be "bursty" (e.g., can see workload spikes), because the workload can rely on the schedule of users.

In view of the above context, and as described in further detail herein, implementations of the present disclosure enable resource usage of a data analytics system to be monitored, and a notification to be issued in response to detecting deterioration of performance. In some implementations, individual servers of the data analytics system are monitored based on a plurality of metrics. In some implementations, a server can be automatically re-configured to alleviate performance degradation.

Figure 1:
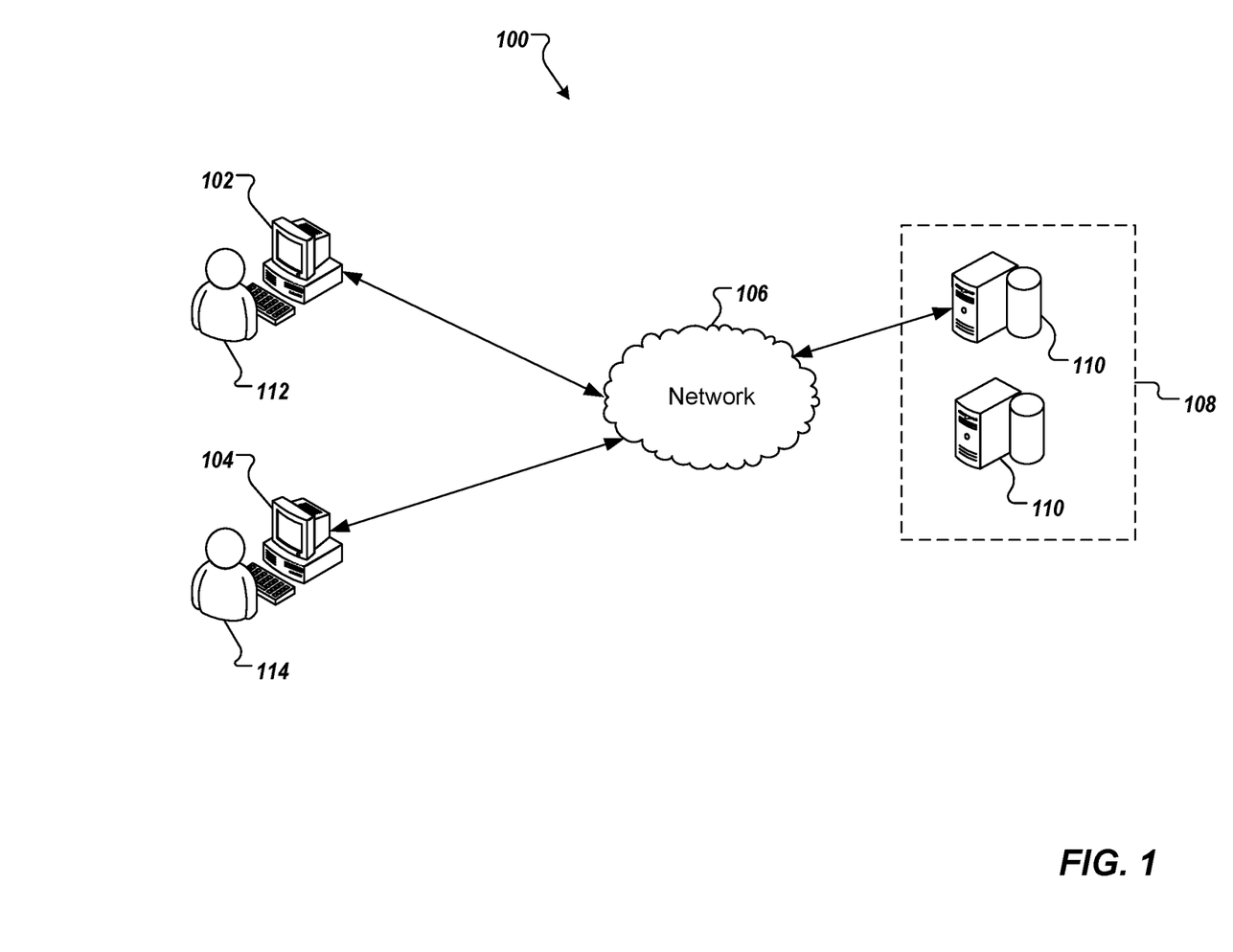
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, 104, a server system 108, and a network 106. The server system 108 includes multiple servers (e.g., processors, memory) and databases (collectively referenced as 110). In the context of the present disclosure, the servers 110 are respective hardware and/or software platforms. In the depicted example, respective users 112, 114 interact with the client devices 102, 104. In an example context, the user 112 can include a user (e.g., customer), who interacts with a data analytics system that is hosted by the server system 108. In an example context, the user 114 can include a user (e.g., administrator), who interacts with the server system 108 to perform maintenance activities (e.g., configure/deploy servers).

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server 110 includes at least one server and at least one data store. In the example of FIG. 1, each server 110 is intended to represent various forms of servers including, but not limited to a web server, an application server, a proxy server, a network server, and/or a server pool. In general, servers accept requests for application services and provides such services to any number of client devices (e.g., the client devices 102, 104 over the network 106).

In some implementations, one or more data stores of the server system 108 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

Implementations of the present disclosure are described in further detail herein with reference to an example context. The example context includes a data analytics system that is hosted by a server system, and is executed in a client-server architecture, such as the example architecture 100 of FIG. 1. In some examples, a data analytics system can be provided in a suite that includes two or more data analytics applications. As mentioned above, an example data analytics system can include the SAP BI platform. Example data analytics applications can include design applications, report applications, dashboard applications, intelligence applications, analysis applications, and search applications. With reference to the SAP BI platform, example data analytics applications, also referred to as BI tools, include Crystal Reports, Dashboards, Web Intelligence, Business Objects (BO) Analysis, and BO Explorer. In some examples, a report application (e.g., Crystal Reports) can directly access tables stored in one or more databases to generate one or more reports. In some examples, an analysis application (e.g., BO Analysis), and an explorer application (e.g., BO Explorer) can directly access views (e.g., a result set of a stored query data) in one or more databases to analyze and explore data stored therein. In some examples, a report application (e.g., Crystal Reports), a dashboard application (e.g., Dashboards), and/or an intelligence application (e.g., Web Intelligence) use relational universes to connect to one or more databases to analyze data, and generate reports and visualizations. In some examples, a universe is a representation of one or more data objects within a database, which masks complexities of typical database interactions. In some examples, a universe can be based on views or tables in the one or more databases.

Figure 2:
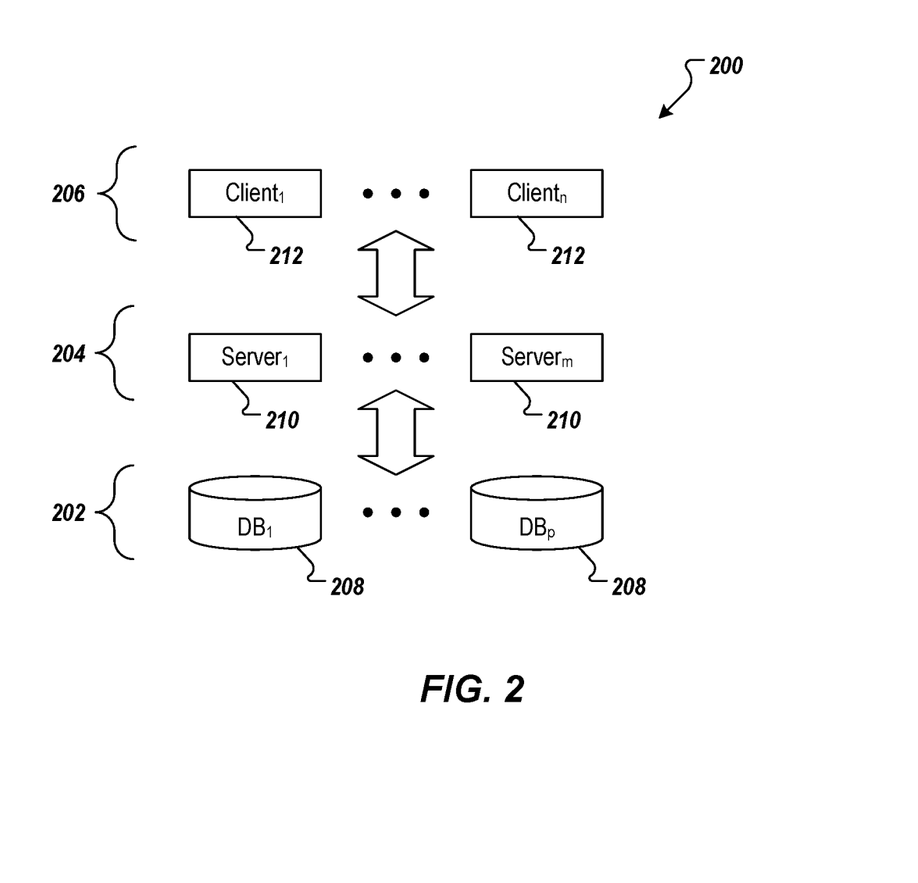
FIG. 2 depicts example layers in an example data analytics architecture.

FIG. 2 depicts example layers in an example data analytics architecture 200. The example data analytics architecture includes a database layer 202, a server layer 204, and a client layer 206. In some implementations, the database layer 202 includes one or more databases 208 (e.g., $DB_1, \ldots DB_p$). In some implementations, the server layer 204 includes one or more servers 210 (e.g., $Server_1, \ldots, Server_m$). Example servers can include an adaptive processing server, an intelligence server, a central management server, and an adaptive job server, each server executing respective services and serving different purposes. In some implementations, the client layer 206 includes one or more clients 212 (e.g., $Client_1, \ldots, Client_n$). In some examples, a client 212 can include a thin client, which leverages computing resources provided by the server layer 204.

In some implementations, one or more data analytics applications can be executed in the server layer 204 (e.g., on one or more of the servers 210), and a user can interact with the one or more data analytics layers through the client layer 206 (e.g., using one or more of the clients 212). For example, a user can access a client 212 (e.g., executing on a computing device, such as the client device 102 of FIG. 1) to interact with a report application executed in the server layer 204 (e.g., executing on a server, such as the server 110 of FIG. 1), to generate one or more reports. For example, the report application can access data stored in the database layer 202 to generate the one or more reports. In general, functionality provided by data analytics applications of the data analytics system are performed by the servers 210 of the server layer 204. which are responsible for processing the data, and generating reports, among other functionalities. As introduced above, the performance of the servers can degrade over a period of time due to increase in amounts of data and usage, for example.

In accordance with implementations of the present disclosure, self-healing and predictive maintenance services are provided, as described in further detail herein. In some examples, implementations of the present disclosure detect potential performance degradation and notify the system administrators. In some examples, implementations of the present disclosure execute measures to alleviate performance degradation, and maintain the system as and when required.

In some implementations, each server has one or more metrics that are periodically updated in the data analytics system. In some examples, the one or more metrics are updated to tune a respective server, and thereby also the data analytics system. In some examples, tuning of the data analytics system is based on size and usage of the data analytics system, and can be at least partially conducted automatically to avoid any possible errors that might occur, if done manually. In some examples, performance of the data analytics system depends on the metrics. Example metrics can include maximum memory allocated, number of CPU cores, a performance rating of the hardware used, a maximum number of connections requests allowed, and the like.

In accordance with implementations of the present disclosure, a service thread is executed, which periodically calculates a performance score for each of the servers. In some implementations, and as described in further detail herein, the performance score is based on usage of the system and respective server metrics. As also described in further detail herein, a threshold performance score is determined during an evaluation period. In some implementations, during the evaluation period, the service thread monitors respective servers, and determines a threshold performance score for each server. In some examples, the threshold performance score represents a maximum capability of a respective server. In some implementations, after expiration of the evaluation period, the actual performance of the respective servers is monitored, and respective performance scores are periodically determined.

In some implementations, each performance score is periodically compared to a respective threshold performance score. In some examples, if the performance score exceeds the threshold performance score a predetermined number of times (e.g., V times, where V is an integer greater than or equal to 1) in a predefined period of time (e.g., D minutes, hours, days, weeks, etc., where D is an integer greater than or equal to 2) a notification is issued. For example, the notification can include a performance report that is provided to the administrator, and that provides information regarding deteriorated performance of one or more servers. In some examples, self-healing of the one or more servers can be initiated, as described in further detail herein. For example, the notified administrator can confirm that self-healing is to be executed, and in response, the data analytics system can perform software-based resizing and reconfiguration of the one or more servers (e.g., creation of additional serves (virtual servers), and/or adjusting one or more metrics).

In some implementations, a performance score (P) is based on the concept of total probability. In some examples, the probability (p) of time taken to perform data analytics functions (e.g., generate a report) for a respective server is provided based on the following example relationship:

$$p(t) = \frac{(A \times k \times R)}{(M \times S \times C)} \qquad (1)$$

where A is the average report size (e.g., measured in GB), k is a coefficient, R is a request rate, M is the maximum memory of the respective server, S is the performance rating of the server hardware, and C is the number of CPU cores of the respective server.

With respect to the average report size (A), in some examples, it is estimated that every Q GB of report size would be required to process R data cells in the report, and the coefficient k is set accordingly. For example, it can be estimated that every 1 GB of report size would be required to process 1,000,000 data cells in the report. Consequently, k can be set equal to 1,000,000.

In some implementations, in order to calculate the average report size, the size of the reports is determined from report metadata in a report database. In some examples, the average report size is specific to a particular report generated by the respective database. By way of non-limiting example, intelligence reports (e.g., web intelligence (webi) reports) can be considered. In some examples, the database is queried for both the number of reports and the size of each report. An example query can be provided as: IInfoObjects reports=SELECT SI_FILES FROM CI_INFOOBJECTS WHERE SI_KIND='Webi'. A total size is determined as the sum of the sizes of all of the reports returned from the query. The average report size is determined as the total size divided by the number of reports (count) returned from the query.

In some implementations, the request rate (R) is determined as a number of requests submitted to the respective server per unit of time. In some examples, the request rate is provided as a request count per minute. In some implementations, the request rate is calculated is based on the audit events stored in an audit database, which logs each request submitted to the respective server (e.g., event data is stored in an audit table (AUDIT_EVENT)). For example, every event (e.g., view, refresh, report) performed on the data is recorded in the audit table in the audit database. In some implementations, a column called RESPONSE_TIME is included in the audit table, which records the time taken for respective events performed on the data and report.

In some implementations, an event count is determined by querying the audit database. An example query can be provided as: SELECT COUNT (EVENT_ID), REPORT_ID, EVENT_START_TIME FROM AUDIT_EVENT WHERE EVENT_TYPE_ID=1002 AND EVENT_START_TIME=Today (where 1002 is referred as refresh event ID). The example query would return a count of all the refresh events that occurred today. In some examples, a difference in the start time of the first event and last event would give the duration of time when the refresh event occurred. For example, a total duration can be determined as:

$$Total\_duration=(S2-S1) \quad (2)$$

where S1 is the start time for a first row, and S2 is a start time for last row (e.g., in minutes). In some examples, an event count (Event_Cnt) is determined (e.g., by querying the audit database) to provide the number of the events occurred during the total duration. In some examples, the request rate is determined as the quotient of event count to total duration.

In some implementations, an average response time (Avg_Time) is determined for each event (e.g., report generation). In some examples, the average response time is determined for a particular event type (e.g., particular report) as the sum of the response times (e.g., from the column RESPONSE_TIME) divided by the number of occurrences of the event. For example, in determining the performance score for a Web Intelligence processing server, the average response time for only webi reports (events) is determined.

In some implementations, the performance score of the respective server is relatively proportional to the probability of response time (p(t)), described herein. Consequently, an increase in average response time and p(t) directly influences an increase in the performance score, which can result in violation of the threshold score. In some examples, the performance score ranges between a minimum value (e.g., 1), and a maximum value (e.g., 10). The performance score can be determined based on the following example relationship:

$$P = \frac{(10 \times Avg\_Time)}{p(t)} \quad (3)$$

In some implementations, an initial period is provided, during which performance scores are periodically calculated for respective servers, and respective threshold performance scores are determined. For example, the initial period can include a month (e.g., 30 days), and a performance score can be determined for each day for the respective server. In some examples, the initial period begins upon initial configuration and production use of the respective server. In some examples, the initial period begins upon reconfiguration of the respective server (e.g., the respective server was in production use, then was reconfigured). In some implementations, upon expiration of the initial period, a threshold performance score is determined for each server. In some examples, the threshold performance score is provided as an average of the performance scores determined for the respective server during the initial period.

Upon expiration of the initial period, and determination of the threshold performance score, a performance score of the respective is periodically determined, and is compared to the threshold performance score. In some examples, a performance score is determined, and is compared to the threshold performance score on a daily basis. In some implementations, a violation occurs, if the performance score of a particular period (e.g., day) exceeds the threshold performance score. In some examples, a violation count (V) is incremented in response to occurrence of a violation. In some implementations, a number of consecutive violations (D) is determined and is compared to a threshold count ($D_{THR}$).

In some implementations, if the number of consecutive violations achieves the threshold count, it is determined that an intervention is required. For example, an example threshold count can be provided as three (e.g., $D_{THR}=3$). If three violations occur, but they do not occur on consecutive periods (e.g., days), the number of consecutive violations is less than three (e.g., D<3). Consequently, it can be determined that intervention is not required. As another example, if three violations occur, and they occur on consecutive periods (e.g., days), the number of consecutive violations is equal to three (e.g., D=3). Consequently, it can be determined that intervention is required.

In some implementations, in response to the number of consecutive violations achieving the threshold count, the intervention is triggered to adapt the data analytics system to alleviate potential performance degradation. For example, a notification is generated and is transmitted to a responsible party (e.g., administrator). Example notifications can include, without limitation, an email message to an administrator, and a notification in an application (e.g., business intelligence application) providing a list of servers that need to be tuned and also information on the hardware upgrade that administrator needs to do to one or more clusters.

In some implementations, at least partial healing of the data analytics system can be automatically triggered. For example, in response to the number of consecutive violations achieving the threshold count (e.g., an upon approval of a responsible party), one or more configuration parameters of the respective server can be automatically adjusted to enable the server to be more responsive to received requests. Example configuration parameters can include, without limitation, a number of concurrent request that a server can handle at a time, memory allocated to each server, number of CPU cores assigned to each server, and number of connections allowed per server.

In some implementations, a performance audit table is maintained for the data analytics system to record occurrences of violations. In some examples, in response to a violation, the performance audit table can record the server name (e.g., a unique identifier assigned to the server), the threshold performance score, the performance score that resulted in the violation, the current count of consecutive days, and the day/time of the violation.

Figure 3:
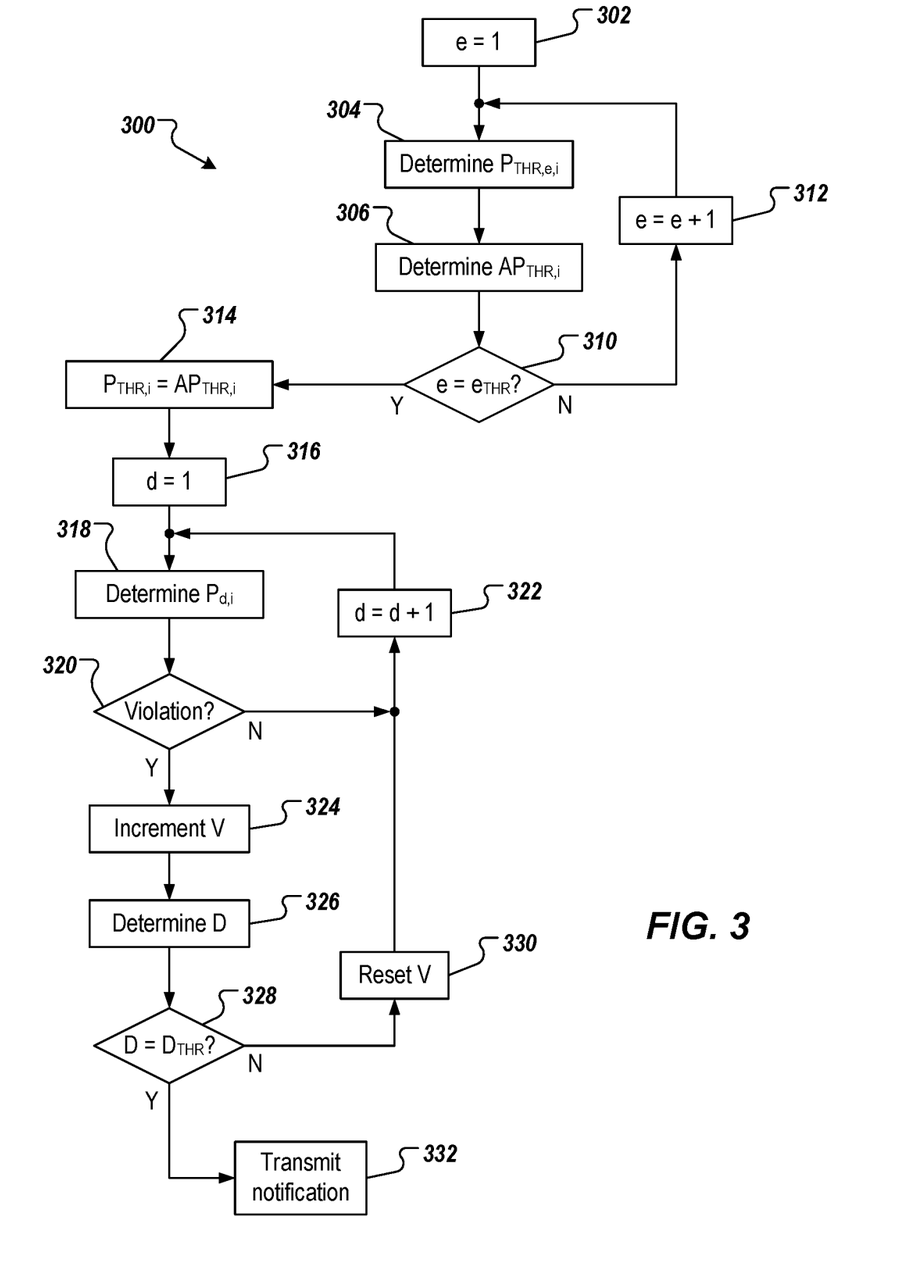
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. In some examples, the example process 300 can be executed for a respective server (e.g., $Server_i$) to determine a threshold performance score ($P_{THR,i}$) during an initial period (e.g., 30 days), and to monitor performance of the respective server with respect to the threshold performance score. In some examples, the example process 300 is executed after initial configuration of the respective server, or after the respective sever has been reconfigured.

A counter e is set equal to 1 (302). In some examples, the counter e reflects time that has passed during the initial period. The threshold performance score for the respective server at time e ($P_{THR,e,i}$) is determined. For example, $P_{THR,e,i}$ is determined as described herein (e.g., Equation 3). An average performance score ($AP_{THR,i}$) is determined (306). For example, $AP_{THR,i}$ is determined as the average of all $P_{THR,e,i}$'s recorded during the initial period. It is determined whether e is equal to a threshold ($e_{THR}$) (310). In other words, it is determined whether the initial period has expired (e.g., $e_{THR}$=30 days). If e is not equal to $e_{THR}$, the counter e is incremented (312), and the example process 300 loops back. If e is equal to $e_{THR}$, $P_{THR,i}$ is set equal to $AP_{THR,i}$ (314).

A counter d is set equal to 1 (316). In some examples, the counter d reflects a period for determining the performance score of the respective server. For example, the performance score can be determined daily. Consequently, the counter d counts days. A performance score ($P_{d,i}$) of the respective server is determined (318). For example, $P_{d,i}$ is determined as described herein (e.g., Equation 3). It is determined whether a violation has occurred (320). For example, it is determined whether $P_{d,i}$ exceeds $P_{THR,i}$. If a violation has not occurred, d is incremented (322), and the example process 300 loops back. If a violation has occurred, a counter V is incremented (324). In some examples, the counter V counts a number of violations that have occurred, and can be initially set equal to zero. A count D is determined (326). In some examples, the count D indicates a number of consecutive violations. For example, if the violation is the first violation occurring for the respective server since $P_{THR,i}$ was determined (314), the count D would be equal to 1. As another example, if the violation is the second violation occurring, and another violation occurred at d−1 (e.g., multiple, consecutive violations), the count D would be equal to 2. As another example, if the violation is the second violation occurring, and another violation occurred at d−2 (e.g., multiple violations, but not consecutive), the count D would be equal to 1. As another example, if the violation is the third violation occurring, and other violations occurred at d−1 and d−2 (e.g., multiple, consecutive violations), the count D would be equal to 3.

It is determined whether D is equal to a threshold count ($D_{THR}$) (328). In other words, it is determined whether a threshold number of consecutive violations has occurred (e.g., 3 violations in a row). If D is not equal to $D_{THR}$, V is reset (330) (e.g., set equal to zero), d is incremented (322), and the example process 300 loops back. If D is equal to $D_{THR}$, a notification is transmitted (332).

Implementations of the present disclosure provide one or more of the following advantages. In some examples, performance deterioration of a data analytics system can be alleviated and/or avoided, thereby preventing end users from experiencing deteriorated performance. In some examples, a need for resizing and/or reconfiguring servers of the data analytics system can be automatically determined. In some examples, real-time, or near real-time identification of performance degradation is provided based on usage statistics. In some examples, self-healing is provided through automatic adjustment of one or more parameters (e.g., configurable, software-based server parameters that can alleviate performance degradation).

Figure 4:
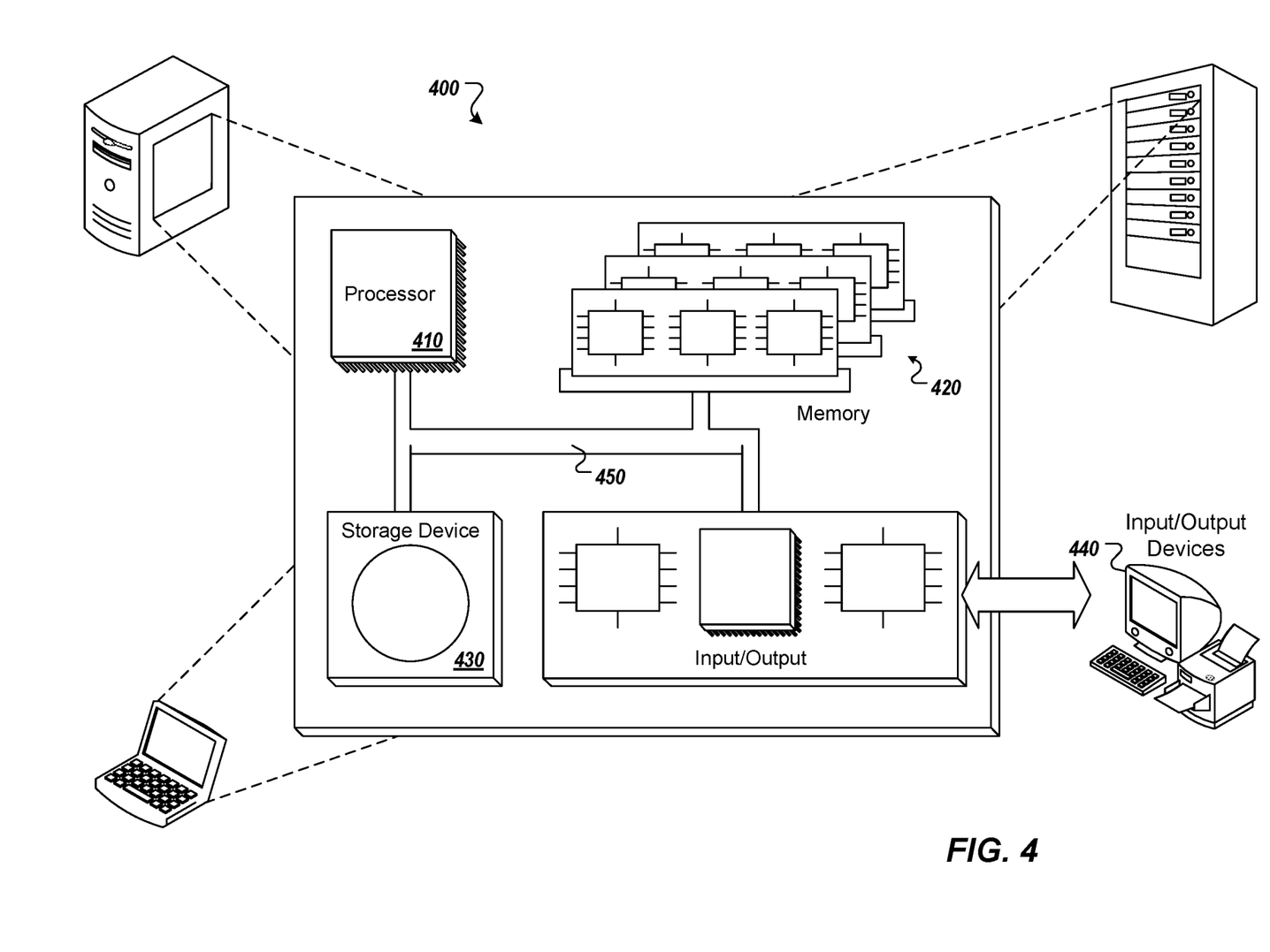
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically addressing performance degradation in a data analytics system comprising multiple servers, the method being executed using one or more processors and comprising:
   determining, by the one or more processors, a first threshold performance score for each server of the multiple servers during a first initial period, the first threshold performance scores being determined at least partially based on a report generated by a respective server;
   after the first initial period, and for each server:
      intermittently calculating, by the one or more processors, a performance score that is calculated based on an average response time for a set of events handled by the respective server and a probability of response time associated with performance of data analytics functions by the respective server,
      comparing, by the one or more processors, the performance score to the first threshold performance score to determine whether a violation indicating performance degradation occurs,
      transmitting, by the one or more processors, a notification to report consecutive violations, and
      automatically adjusting, by the one or more processors, one or more parameters of the server to provide one or more adjusted parameters that at least partially alleviate the performance degradation; and
   executing each server based on respective one or more adjusted parameters during a second initial period, and determining a second threshold performance score for each server of the multiple servers during the second initial period.

2. The method of claim 1, wherein the one or more parameters comprise at least one of a number of concurrent requests for the respective server, a memory allocated to the respective server, a number of CPU cores assigned to the respective server, and a number of connections allowed per the respective server.

3. The method of claim 1, wherein the probability of response time is determined based on one or more of an average report size, a request rate, a maximum memory, a performance rating, and a number of CPU cores of the respective server.

4. The method of claim 1, wherein determining a first threshold performance score for each server of the multiple servers during a first initial period comprises, for each server, calculating multiple performance scores during the first initial period, and providing the first threshold performance score as an average of the multiple performance scores.

5. The method of claim 1, wherein a violation indicating performance degradation occurs in response to determining that the performance score exceeds the first threshold performance score.

6. The method of claim 1, wherein the consecutive violations comprise two or more consecutive performance scores exceeding the first threshold performance score.

7. A non-transitory computer-readable storage medium coupled to one or more processors and having instructions stored thereon which, when executed by the one or more processors, cause the one or more processors to perform operations for automatically detecting potential performance degradation in a data analytics system comprising multiple servers, the operations comprising:
   determining a first threshold performance score for each server of the multiple servers during a first initial period, the first threshold performance scores being determined at least partially based on a report generated by a respective server;
   after the first initial period, and for each server:
      intermittently calculating a performance score that is calculated based on an average response time for a set of events handled by the respective server and a probability of response time associated with performance of data analytics functions by the respective server,
      comparing the performance score to the first threshold performance score to determine whether a violation indicating performance degradation occurs,
      transmitting a notification to report consecutive violations, and
      automatically adjusting one or more parameters of the server to provide one or more adjusted parameters that at least partially alleviate the performance degradation; and
   executing each server based on respective one or more adjusted parameters during a second initial period, and determining a second threshold performance score for each server of the multiple servers during the second initial period.

8. The computer-readable storage medium of claim 7, wherein the one or more parameters comprise at least one of a number of concurrent requests for the respective server, a memory allocated to the respective server, a number of CPU cores assigned to the respective server, and a number of connections allowed per the respective server.

9. The computer-readable storage medium of claim 7, wherein& the probability of response time is determined based on one or more of an average report size, a request rate, a maximum memory, a performance rating, and a number of CPU cores of the respective server.

10. The computer-readable storage medium of claim 7, wherein determining a first threshold performance score for each server of the multiple servers during a first initial period comprises, for each server, calculating multiple performance scores during the initial period, and providing the first threshold performance score as an average of the multiple performance scores.

11. The computer-readable storage medium of claim 7, wherein a violation indicating performance degradation occurs in response to determining that the performance score exceeds the first threshold performance score.

12. The computer-readable storage medium of claim 7, wherein the consecutive violations comprise two or more consecutive performance scores exceeding the first threshold performance score.

13. A system, comprising:
a computing device; and
a computer-readable storage device coupled to the computing device and having instructions stored thereon which, when executed by the computing device, cause the computing device to perform operations for automatically detecting potential performance degradation in a data analytics system comprising multiple servers, the operations comprising:
determining a first threshold performance score for each server of the multiple servers during a first initial period, the first threshold performance scores being determined at least partially based on a report generated by a respective server;
after the first initial period, and for each server:
intermittently calculating a performance score that is calculated based on an average response time for a set of events handled by the respective server and a probability of response time associated with performance of data analytics functions by the respective server,
comparing the performance score to the first threshold performance score to determine whether a violation indicating performance degradation occurs,
transmitting a notification to report consecutive violations, and
automatically adjusting one or more parameters of the server to provide one or more adjusted parameters that at least partially alleviate the performance degradation; and
executing each server based on respective one or more adjusted parameters during a second initial period, and determining a second threshold performance score for each server of the multiple servers during the second initial period.

14. The system of claim 13, wherein the one or more parameters comprise at least one of a number of concurrent requests for the respective server, a memory allocated to the respective server, a number of CPU cores assigned to the respective server, and a number of connections allowed per the respective server.

15. The system of claim 13, wherein the probability of response time is determined based on one or more of an average report size, a request rate, a maximum memory, a performance rating, and a number of CPU cores of the respective server.

16. The system of claim 13, wherein determining a first threshold performance score for each server of the multiple servers during a first initial period comprises, for each server, calculating multiple performance scores during the first initial period, and providing the first threshold performance score as an average of the multiple performance scores.

17. The system of claim 13, wherein a violation indicating performance degradation occurs in response to determining that the performance score exceeds the first threshold performance score.

18. The system of claim 13, wherein the consecutive violations comprise two or more consecutive performance scores exceeding the threshold performance score.

* * * * *